United States Patent [19]

Yamauchi et al.

[11] Patent Number: 4,503,120
[45] Date of Patent: Mar. 5, 1985

[54] MAGNETIC RECORDING MEDIUM

[75] Inventors: Koichi Yamauchi; Nobuo Tsuji; Yasuyuki Yamada; Shinichi Funabashi; Masatoshi Kiyama, all of Kanagawa, Japan

[73] Assignee: Fuji Photo Film Co., Ltd., Kanagawa, Japan

[21] Appl. No.: 505,506

[22] Filed: Jun. 17, 1983

[30] Foreign Application Priority Data

Jun. 17, 1982 [JP] Japan ................... 57-104132

[51] Int. Cl.$^3$ ............................................. G11B 5/70
[52] U.S. Cl. ........................................ 428/336; 360/134; 360/135; 360/136; 252/62.54; 427/128; 428/423.1; 428/423.7; 428/480; 428/522; 428/694; 428/900
[58] Field of Search .......... 428/694, 336, 900, 695, 428/425.9, 692, 423.1, 423.7, 480, 522; 252/62.54; 427/128; 360/134, 135, 136

[56] References Cited

U.S. PATENT DOCUMENTS

| | | | |
|---|---|---|---|
| 4,135,016 | 1/1979 | Ogama et al. | 428/900 |
| 4,284,750 | 8/1981 | Amirsabis | 427/132 |
| 4,352,859 | 10/1982 | Yoda et al. | 428/480 |
| 4,400,435 | 8/1983 | Yoda et al. | 428/695 |
| 4,431,700 | 2/1984 | Yamada et al. | 428/694 |
| 4,431,712 | 2/1984 | Matsufuji et al. | 428/694 |
| 4,454,202 | 6/1984 | Komine et al. | 427/128 |

FOREIGN PATENT DOCUMENTS

| | | | |
|---|---|---|---|
| 3130146 | 3/1982 | Fed. Rep. of Germany | 427/128 |
| 54-153009 | 12/1979 | Japan | 427/128 |
| 57-44225 | 3/1982 | Japan | 427/128 |
| 58-145722 | 8/1983 | Japan | 252/62.54 |

Primary Examiner—Stanley S. Silverman
Attorney, Agent, or Firm—Sughrue, Mion, Zinn, Macpeak and Seas

[57] ABSTRACT

A magnetic recording medium which comprises a non-magnetic support having thereon a magnetic recording layer containing a ferromagnetic fine powder and a binder as main components is disclosed. The magnetic recording layer containing as the binder (1) a vinyl chloride-vinyl acetate-maleic acid copolymer which has a mean polymerization degree of about 300 to about 400 and a maleic acid fraction of about 0.6 to about 1.5 wt %, (2) a polyurethane resin which has a number average molecular weight of 40,000 to 100,000 and is prepared from (i) a mixture of polyneopentyladipate having a mean molecular weight of 500 to 2,500 and polybutyleneadipate having a mean molecular weight of 500 to 2,500 with a mixing ratio of the former to the latter of from 2/8 to 9/1 by weight and (ii) diphenylmethane diisocyanate, and optionally (3) a low molecular weight polyisocyanate compound.

14 Claims, No Drawings

MAGNETIC RECORDING MEDIUM

FIELD OF THE INVENTION

The present invention relates to a magnetic recording medium excellent in surface properties and more particularly, to a coating type magnetic recording medium characterized by its binder composition.

BACKGROUND OF THE INVENTION

Conventional binders for magnetic recording media of the coating type include vinyl chloride-vinyl acetate copolymers, cellulose derivatives, acryl resins (i.e., copolymers of acrylic acid or methacrylic acid with their esters), polyurethane resins, vinylidene chloride copolymers, synthetic rubbers, polyesters and so on which have been prevailingly employed individually and in various combinations. In addition, there are also known a large nummber of binder compositions of the type which contain hydroxyl group-containing thermoplastic resins in combination with polyisocyanates to harden the films coated. However, surface properties excellent enough to be used in high density video tapes are not always attained with conventional methods and binder compositions as described in, for example, U.S. Pat. No. 4,135,016.

SUMMARY OF THE INVENTION

The present inventors have examined vinyl chloride-vinyl acetate-maleic acid copolymers and polyurethanes to the extent of taking their chemical structures into consideration. This was done in order to find a binder which would impart excellent surface properties to the high density magnetic recording layer. As a result of these studies the present inventors have found that excellent surface properties, that is, high signal to noise ratio (S/N), can be obtained by using a binder composition comprised of a vinyl chloride-vinyl acetate-maleic acid copolymer and a polyurethane resin having particular chemical compositions.

A primary object of this invention is to provide a magnetic recording medium which is excellent with respect to its signal to noise ratio and abrasion resistance. These and other objects are obtained by a magnetic recording medium which comprises a non-magnetic support having thereon a magnetic recording layer containing a ferromagnetic fine powder and a binder as main components. The binder is comprised of (1) a vinyl chloride-vinyl acetate-maleic acid copolymer which has a mean polymerization degree of about 300 to about 400 and a maleic acid fraction of about 0.6 to about 1.5 wt% and (2) a polyurethane resin which has a number average molecular weight of 40,000 to 100,000 and is prepared from a mixture, in which polyneopentyladipate having a mean molecular weight of 500 to 2,500 and polybutyleneadipate having a mean molecular weight of 500 to 2,500 are mixed with a mixing ratio of the former to the latter ranging from 2/8 to 9/1 by weight, and diphenylmethane diisocyanate. Further, the above-described binder may additionally contain a low molecular weight polyisocyanate compound which causes the formation of three-dimentional networks in the magnetic layer, resulting in an increase in physical strength.

In the magnetic recording medium of this invention, calendering can be effected to a very satisfactory extent through synergistic effects of a vinyl chloride-vinyl acetate-maleic acid copolymer and a particular polyurethane resin which can impart proper softness to the magnetic recording layer. Therefore, a magnetic recording medium excellent in surface smoothness, and in turn, excellent in S/N ratio, can be provided with this invention.

DETAILED DESCRIPTION OF THE INVENTION

Preferable examples of the vinyl chloride-vinyl acetate-maleic acid copolymer to be employed in this invention are those which have a mean polymerization degree of about 300 to about 400, more preferably 310 to 360, and a maleic acid fraction of about 0.6 to about 1.5 wt%, more preferably 0.8 to 1.3 wt%. Viscosity of the copolymer is preferably from 0.10 to 0.30 cps and more preferably from 0.15 to 0.20. If the copolymer has a polymerization degree which is too low, it causes a reduction in film forming ability and a sturdy film can not be obtained. On the other hand, if the copolymer has a polymerization degree which is too high, the dissolving speed in solvents is decreased, which is undesirable from the standpoint of manufacturing magnetic tapes. If the maleic acid fraction is too small, the dispersibility of magnetic substances thereinto is reduced and the abrasion resistance of the resulting magnetic layer is deteriorated, whereas if the copolymer has a maleic acid fraction which is too large, there is same deterioration of the solubility, the dispersibility of magnetic substances thereinto and the abrasion resistance of the resulting magnetic layer.

Polyneopentyladipate and polybutyleneadipate which constitute the polyester part of the polyurethane resin have their respective mean molecular weight in the same range of 500 to 2,500, preferably 800 to 2,000. If these adipates have mean molecular weights of less than 500, the resulting polyurethane resin becomes very hard, whereas if the molecular weights thereof are more than 2,500, the resulting polyurethane resin becomes too soft and the resulting magnetic layer possesses too poor durability to withstand vigorous rubbing with a magnetic head.

A preferable mixing ratio of these two adipates ranges from 2/8 to 9/1 by weight more preferably from 4/6 to 7/3 by weight. If the proportion of polyneopentyladipate is increased beyond the above-described range, the resulting polyurethane resin is too hard, whereas if it is decreased below the above-described range, the polyurethane resin tends to become too soft. Therefore, the range of 2/8 to 9/1 is recommended. Polyisocyanates are employed for imparting rigidity to the resulting polyurethane molecules. From this point of view, diphenylmethane diisocyanate is best, provided that the above-described polyesters are employed in combination.

If the polyurethane resin prepared from the above-described compounds has a molecular weight of 100,000 or above, it is slightly dissolved in general solvents, whereas it has a molecular weight of 40,000 or below, the physical strength of the resulting magnetic layer is reduced. Therefore, the range of 40,000 to 100,000 is suitable.

The low molecular weight isocyanate to be employed in this invention includes those having at least two isocyanate groups, that is, di-, tri- and tetra-isocyanates of aliphatic hydrocarbons, alicyclic hydrocarbons and aromatic hydrocarbons such as benzene, naphthalene, biphenyl, diphenylmethane, triphenylmethane and the like, and their addition products. Specific examples of such isocyanates are ethanediisocyanate, butane-ω,ω'-diisocyanate, hexane-ω,ω'-diisocyanate, 2,2-dimethylpentane-ω,ω'-diisocyanate, 2,2,4-trimethylpentane-ω,ω'-diisocyanate, decane-ω,ω'-diisocyanate, ω,ω'-diisocyanato-1,3-dimethylbenzole, ω,ω'-diisocyanato-1,2-dimethylcyclohexane, ω,ω'-diisocyanato-1,4-diethylbenzole, ω,ω'-diisocyanato-1,5-dimethylnaphthalene, ω,ω'-diisocyanato-n-propylbiphenyl, 1,3-phenylenediisocyanate, 1-methylbenzole-2,4-diisocyanate, 1,3-dimethylbenzole-2,6-diisocyanate, naphthalene-1,4-diisocyanate, 1,1'-dinaphthyl-2,2'-diisocyanate, biphenyl-2,4'-diisocyanate, 3,3'-dimethylbiphenyl-4,4'-diisocyanate, diphenylmethane-4,4'-diisocyanate, 2,2'-dimethyldiphenylmethane-4,4'-diisocyanate, 3,3'-dimethoxydiphenylmethane-4,4'-diisocyanate, 4,4'-diethoxydiphenylmethane-4,4'-diisocyanate, 1-methylbenzole-2,4,6-triisocyanate, 1,3,5-trimethylbenzole-2,4,6-triisocyanate, diphenylmethane-2,4,4'-triisocyanate, triphenylmethane-4,4', 4"-triisocyanate, tolylenediisocyanate, 1,5-naphthylenediisocyanate and like isocyanates; dimers or trimers of the isocyanates set forth above; and addition products of the above-described isocyanates and di- or tri-hydric polyalcohols. Of these, tri-isocyanates such as the addition product of 1 mole of trimethylolpropane and 3 moles of tolylenediisocyanate and that of 1 mole of trimethylolpropane and 3 moles of hexamethylenedisocyanate are particularly preferred. Such a low molecular weight polyisocyanate compound is preferably added in a proportion of 5 to 40% based on the total weight of all the binder components.

Ferromagnetic fine powders to be dispersed into binders, solvents, additives such as a dispersing agent, a lubricant, an abrasive, an antistatic agent and so on, and non-magnetic supports which can be used in this invention include those which are conventionally employed in this art, respectively.

Suitable materials which can be used for the non-magnetic support include polyesters such as polyethylene terephthalate, polyethylene-2,6-naphthalate, etc.; polyoleffins such as polyethylene, polypropylene, etc.; cellulose derivatives such as cellulose triacetate, cellulose diacetate, cellulose acetate butylate, cellulose acetate propionate, etc.; vinyl resins such as polyvinyl chloride, polyvinylidene chloride, etc.; and other synthetics such as polycarbonate, polyamide, polyimide, polyamideimide, etc.

Examples of the ferromagnetic fine powders which can be used in this invention include ferromagnetic iron oxide powder, ferromagnetic chromium dioxide powder, ferrogentic alloy powder and the like.

To such a ferromagnetic iron oxide powder may be added divalent metals. Specific examples of such divalent metals are Cr, Mn, Co, Ni, Cu, Zn, etc., and they can be added in an amount of generally 0 to 10 atomic % based on the iron oxide.

The above-described ferromagnetic chromium dioxide include $CrO_2$ per se and $CrO_2$ to which 0 to 20 wt% of metals such as Na, K, Ti, V, Mn, Fe, Co, Ni, Tc, Ru, Sn, Ce, Pb, etc., semi metals such as P, Sb, Te, etc., or oxides of these metals have been added.

Suitable examples of the dispersing agent which can be used in this invention include fatty acids having 12 to 18 carbon atoms ($R_1COOH$; where $R_1$ is an alkyl or alkenyl group having 11 to 17 carbon atoms) such as caprylic acid, capric acid, lauric acid, myristic acid, palmitic acid, stearic acid, oleic acid, elaidic acid, linoleic acid, linolenic acid, stearolic acid, etc.; metallic soaps comprising alkali metal (Li, Na, K, etc.) salts or alkaline earth metal (Mg, Ca, Ba, etc.) salts of the above-described fatty acids; fluroine-containing ester compounds of the above-described fatty acids; amides of the above-described fatty acids; polyalkylene oxide alkylphosphates; lecitnin; trialkylpolyolefinoxy quarternary ammonium salts (in which the alkyl moiety contains 1 to 5 carbon atoms, and the olefin is ethylene, propylene, etc.) and the like. In addition, higher alcohols having 12 or more carbon atoms and sulfuric acid esters thereof can be also used. Of these, lauric acid, myristic acid, palmitic acid and stearic acid are preferably used. These dispersing agents also function as lubricants.

Suitable examples of the lubricants which can be used include silicone oils such as dialkylpolysiloxane (in which the alkyl moiety contains 1 to 5 carbon atoms), dialkoxypolysiloxane (in which the alkoxy moiety contains 1 to 4 carbon atoms), monoalkylmonoalkoxypolysiloxane (in which the alkyl moiety contains 1 to 5 carbon atoms, and the alkoxy moiety contains 1 to 4 carbon atoms), phenylpolysiloxane, fluoroalkylpolysiloxane (in which the alkyl moiety contains 1 to 5 carbon atoms), etc.; electrically conductive fine powders such as graphite, etc.; inorganic fine powders such as molybudenum disulfide, tungsten disulfide, etc.; synthetic resin fine powders such as those of polyethylene, polypropylene, ethylene-vinyl chloride copolymer, polytetrafluoroethylene, etc.; α-olefin polymers; unsaturated aliphatic hydrocarbons which are liquid at ordinary temperatures (which are α-olefin wherein the double bond is connected to the terminal carbon atom and about 20 carbon atoms are contained); fatty acid esters prepared from monocarboxylic fatty acids containing 12 to 20 carbon atoms and monohydric alcohols containing 3 to 12 carbon atoms; fluorocarbons; and so on. Of these, silicon oils, graphite, fatty acid esters and fluorocarbons are preferred. Further lauric acid, myristic acid, palmitic acid and stearic acid are also preferably used as the lubricant.

Examples of the abrasives which can be used include fused alumina, silicon carbide, chromium oxide ($Cr_2O_3$), corundum, artificial corundum, diamond, artificial diamond, gernet and emergy (major components: corundum and magnetite), with fused alumina, silicon carbide and chromium oxide being preferred.

Examples of the antistatic agents which can be used include electrically conductive powders such as carbon black, carbon black-graft polymer, etc.; natural surface active agents such as saponin, etc.; nonionic surface active agents of the alkyleneoxide type, glycerin type, glycidol type, etc.; cationic surface active agents such as higher alkylamines, quaternary ammonium salts, pyridine and like hetero ring compounds, phosphoniums, sulfoniums, etc.; anionic surface active agents containing acidic groups such as carboxylic acid groups, sulfonic acid groups, phosphoric acid groups, sulfate groups, phosphate groups, etc.; amphoteric surface active agents such as amino acids, aminosulfonic acids, sulfuric acid or phosphoric acid esters of aminoalcohols, etc.; and so on. Electrically conductive powders are preferably used for the purpose.

Examples of the organic solvents which can be used upon coating include ketones such as acetone, methyl ethyl ketone, methyl isobutyl ketone, cyclohexanone, etc.; esters such as methyl acetate, ethyl acetate, butyl acetate, ethyl lactate, glycol acetate monoethyl ether, etc.; tars (aromatic hydrocarbons) such as benzene, toluene, xylene, etc.; chlorinated hydrocarbons such as methylene chloride, ethylene chloride, carbon tetrachloride, chloroform, ethylene chlorohydrin, dichlorobenzene, etc.; and so on. Of these, methyl ethyl ketone, methyl isobutyl ketone, ethyl acetate, butyl acetate, toluene and xylene are preferably used.

As the binder components, it is essential for this invention to contain the vinyl chloride-vinyl acetate-maleic acid copolymer and the polyurethane as described above. However, other binder components may also be added, such as vinyl chloride-vinyl acetate copolymers, cellulose derivatives, acryl resins, polyurethane resins, polyester resins, vinylidene chloride copolymers and synthetic rubbers. In addition, nitrile rubber and other polymeric plasticizers may further be added in part as a binder component for the purpose of controlling the hardness of the resulting magnetic layer.

The above-described components are employed in the following amounts, respectively.

The amount of binder varies depending on the properties (e.g., specific surface area) of ferromagnetic powders, and it is preferably within the range of 13 to 50 parts by weight, more preferably 17 to 30 parts by weight, per 100 parts by weight of the ferromagnetic powder.

The ratio of the amount of the vinyl chloride-vinyl acetate-maleic acid copolymer to that of the polyurethane resin ranges from 100/130 to 100/20, preferably 100/100 to 100/40, by weight. The amount of solvent used is 3.5 to 4.5 times that of the ferromagnetic fine powder. The dispersing agent is employed within the range of 0.5 to 20 parts by weight per 100 parts by weight of the binder, the lubricant within the range of 0.2 to 20 parts by weight, the abrasive within the range of 0.5 to 20 parts by weight, an electrically conductive fine powder used as the antistatic agent within the range of 0.2 to 20 parts by weight, and a surface active agent used as the antistatic agent within the range of 0 to 3 parts by weight.

A magnetic coating composition is prepared by kneading the above-described ferromagnetic powder, binder, dispersing agent, lubricant, abrasive, antistatic agent, solvent and so on.

The thus prepared magnetic coating composition is coated on a non-magnetic support. A preferred thickness of the magnetic coat is generally within the range of 1 to 18 μm on a dry basis. However, it is appropriately selected depending on the end-use of the magnetic recording medium to be produced, the form (e.g., a film, a tape, a sheet, etc.), the standard and so on.

A suitable drying temperature and time for the magnetic layer depends on the kind of the solvent used, the content thereof in the coating composition, and the allowed residual content in the magnetic layer. The drying temperature is gradually increased as the drying progresses within the range of generally 40° to 100° C. A suitable drying time is about 5 seconds to about 3 minutes.

After drying, the magnetic recording medium may be rolled round a roll or the like, but it is more desirable to submit the magnetic recording medium to a calendering process without rolling it round a roll in order to improve the S/N ratio. Rolls which can be used in the calendering process include conventionally used ones. Namely, calendering is preferably conducted using a super-calendering process comprising passing the magnetic recording medium between two rolls of a metal roll and a cotton toll, a synthetic resin (e.g., nylon, epoxy resin, polyurethane, etc.) roll or a metal roll.

Conditions for the super-calendering are selected properly depending on the kind of the magnetic tape to be processed. However, a between-roll pressure ranging from 80 to 300 kg/cm, preferably 100 to 240 kg/cm, a tape-carrying speed ranging from 30 to 200 m/min, preferably 60 to 150 m/min, and a roll temperature ranging from 25° to 120° C., preferably 45° to 80° C., are generally employed. If the pressure is less than 80 kg/cm, a sufficient surface-smoothing effect is not obtained, whereas if the pressure is more than 300 kg/cm, the life span of the calender rolls is shortened and it is undesirable economically. If the temperature is lower than 25° C., a surface-smoothening effect obtained is insufficient, whereas if it is higher than 120° C., the life span of the calendering rolls is shortened and it is undesirable economically.

The present invention will now be illustrated in more detail by reference to the following examples and comparative examples. Therein, all parts and ratios are by weight unless otherwise indicated.

EXAMPLE 1

| Magnetic Coating Composition: | Parts |
| --- | --- |
| Co-coated $\gamma$-Fe$_2$O$_3$ | 300 |
| (Coercive force: 630 Oe; mean grain size: 0.33 μm) | |
| Vinyl chloride-vinyl acetate-maleic acid copolymer | 35 |
| (Mean polymerization degree: 340; fraction of maleic acid: 0.6 wt %) | |
| Polyurethane resin | 26 |
| (Reaction product between polyneopentyladipate (PNA) having molecular weight of 1,000 - polybutyleneadipate (PBA) having molecular weight of 1,000 (1:1) mixture and diphenylmethane diisocyanate (MDI); number average molecular weight: 60,000) | |
| Electrically conductive carbon black | 15 |
| Abrasive | 24 |
| ($\alpha$-alumina having mean grain size of 0.5 μm - - $\gamma$-alumina having mean grain size 0.02 μm (78:22) mixture) | |
| Myristic acid | 7 |
| Butyl stearate | 1 |
| Solvent | 780 |
| (MEK-butyl acetate (3:7) mixture) | |

The above-described composition was kneaded and dispersed using a ball mill and a sand mill to prepare a magnetic coating composition. Finally, 16 parts (a solid component basis) of the reaction product of 1 mole of trimethylolpropane and 3 mole of tolylenediisocyanate (Colonate L, trade name by Nippon Polyurethane Industry Co., Ltd.) was added to the above-described composition as the low molecular weight polyisocyanate component to prepare the finished solution. The thus obtained coating composition was coated on a 15 μm-thick polyethylene terephthalate film having thereon a polyester type subbing layer to form a magnetic layer having a dry thickness of 5 μm. Then, it was subjected to super-calendering processing to carry out the surface-smoothening of the magnetic layer. This wide film was slit into magnetic tapes having a width of ½ inch. The thus obtained tape was named sample No. 1.

EXAMPLE 2

A tape named sample No. 2 was prepared in the same manner as in Example 1 except that vinyl chloride-vinyl acetate-maleic acid copolymer having a mean polymerization degree of 320 and a maleic acid fraction of 1.0 wt% and a polyurethane resin which was the reaction product between PNA having a molecular weight of 1,000-PBA having molecular weight of 1,200 (6:4) mixture and MDI and had a number average molecular weight of 80,000 were used in place of the corresponding components in Example 1, respectively.

COMPARATIVE EXAMPLE 1

A magnetic tape was prepared in the same manner as in Example 1 except that vinyl chloride-vinyl acetate-vinyl alcohol copolymer (trade name VAGH, produced by Union Carbide Co.; mean polymerization degree: 420; vinyl alcohol fraction: 6.0 wt%) was used in place of the vinyl chloride-vinyl acetate-maleic acid copolymer.

COMPARATIVE EXAMPLE 2

A magnetic tape was prepared in the same manner as in Example 1 except that epoxy resin (Epikote 1001, trade name of Shell Chem. Corp.) was used in place of the polyurethane resin.

COMPARATIVE EXAMPLE 3

A magnetic tape was prepared in the same manner as in Example 1 except that a polyurethane resin comprising PBA having a molecular weight of 2,000 and tolylenediisocyanate and having an average molecular weight of 70,000 was used in place of the polyurethane resin of Example 1.

COMPARATIVE EXAMPLE 4

A magnetic tape was prepared in the same manner as in Example 2 except that a vinyl chloride-vinyl acetate-maleic acid copolymer having a mean polymerization degree of 420 and a maleic acid fraction of 1.0 wt% was used in place of the vinyl chloride-vinyl acetate-maleic acid copolymer of Example 2.

EXAMPLES 3, 4 and 5

Magnetic tapes named sample Nos. 3, 4 and 5 were prepared respectively in the same manner as in Example 1 except that both the vinyl chloride-vinyl acetate-maleic acid copolymer and the polyurethane resin were changed as described in the following Table 1.

TABLE 1

| Example No. | Vinyl chloride-vinyl acetate-maleic acid copolymer | | Polyurethane resin | | | |
|---|---|---|---|---|---|---|
| | Mean polymerization degree | Maleic acid fraction (wt %) | Mean molecular weight of PNA | Mean molecular weight of PBA | Mixing ratio of PNA to PBA | Number average molecular weight |
| 3 | 325 | 1.1 | 1,000 | 1,200 | 7/3 | 80,000 |
| 4 | 340 | 0.9 | 2,000 | 2,000 | 2/8 | 40,000 |
| 5 | 350 | 1.4 | 1,000 | 2,000 | 9/1 | 60,000 |

EXAMPLE 6

A magnetic tape named sample No. 6 was prepared in the same manner as in Example 1 except that the low molecular weight polyisocyanate was not used, an addition amount of the vinyl chloride-vinyl acetate-maleic acid copolymer was altered to 50 parts and an addition amount of the polyurethane resin was altered to 27 parts.

Characteristics of the samples obtained in examples and comparative examples are summarized in Table 2.

TABLE 2

| Sample No. | Chroma S/N*[1] (dB) | Abrasion resistance*[2] (min.) |
|---|---|---|
| 1 | 0 | 30 or more |
| 2 | +0.4 | " |
| 3 | +0.2 | " |
| 4 | +0.1 | " |
| 5 | +0.1 | " |
| 6 | +0.2 | " |
| Comparative Example | | |
| 1 | −0.3 | 8 |
| 2 | −0.2 | 3 |
| 3 | −0.4 | 6 |
| 4 | −0.3 | 20 |

*[1] Relative values calculated adopting the video color signal to noise ratio of sample No. 1 as a comparative basis and taking it as ±0 dB.
*[2] Data obtained by carrying out a still frame test in which a sample tape was set in a VHS type cassette half, the still image was reproduced using a VTR (model NV-8310, made by Matsushita Electric Industrial Co., Ltd.), and the time at which the TV image underwent a change was measured.

It is apparent from the results described above that a magnetic recording medium excellent in chroma S/N and abrasion resistance can be obtained by using as a binder the combination of the vinyl chloride-vinyl acetate-maleic acid copolymer and polyurethane resin defined by this invention.

While the invention has been described in detail and with reference to specific embodiments thereof, it will be apparent to one skilled in the art that various changes and modifications can be made therein without departing from the spirit and scope thereof.

What is claimed is:

1. A magnetic recording medium, which comprises a non-magnetic support having thereon a magnetic recording layer containing ferromagnetic fine powder and binder, said binder comprising:
   (1) a vinyl chloride-vinyl acetate-maleic acid copolymer which has a mean polymerization degree of about 300 to about 400 and a maleic acid fraction of about 0.6 to about 1.5 wt%, and
   (2) a polyurethane resin which has a number average molecular weight of 40,000 to 100,000 and is prepared from (i) a mixture of polyneopentyladipate having a mean molecular weight of 500 to 2,500 and polybutyleneadipate having a mean molecular weight of 500 to 2,500 with a mixing ratio of the polyneopentyladipate to polybutyleneadipate of from 2/8 to 9/1 by weight and (ii) diphenylmethane diisocyanate.

2. The magnetic recording medium of claim 1, wherein said binder additionally contains a low molecular weight polyisocyanate compound.

3. A magnetic recording medium as claimed in claim 1, wherein the vinyl chloride-vinyl acetate-maleic acid copolymer has a mean polymerization degree of about 310 to 360 and a maleic acid fraction of about 0.8 to 1.3 wt%.

4. A magnetic recording medium as claimed in claim 2, wherein the polyisocianate compound is present in an amount within the range of from 5 to 40% based on the total weight of the binder.

5. A magnetic recording medium as claimed in claim 1, wherein the binder is present in an amount within the range of 13 to 50 parts by weight per 100 parts by weight of the ferromagnetic fine powder.

6. A magnetic recording medium as claimed in claim 5, wherein the binder is present in an amount within the range of 17 to 30 parts by weight per 100 parts by weight of the ferromagnetic powder.

7. A magnetic recording medium as claimed in claim 1, wherein the ratio of the vinyl chloride-vinyl acetate-maleic acid copolymer to the polyurethane resin is within the range of 100/130 to 100/20 by weight.

8. A magnetic recording medium as claimed in claim 7, wherein the ratio of the vinyl chloride-vinyl acetate-maleic acid copolymer to the polyurethane resin is within the range of 100/100 to 100/40 by weight.

9. A magnetic recording medium as claimed in claim 1, further comprising a dispersing agent present in an amount within the range of 0.5 to 20 parts by weight per 100 parts by weight of the binder.

10. A magnetic recording medium as claimed in claim 1, further comprising a lublicant present in an amount within the range of 0.2 to 20 parts by weight per 100 parts by weight of the binder.

11. A magnetic recording medium as claimed in claim 1, further comprising an abrasive present in an amount within the range of 0.5 to 20 parts by weight per 100 parts by weight of the binder.

12. A magnetic recording medium as claimed in claim 1, further comprising an electrically conductive fine powder present in an amount within the range of 0.2 to 20 parts by weight per 100 parts by weight of the binder.

13. A magnetic recording medium as claimed in claim 1, further comprising a surface active agent present in an amount within the range of 0 to 3 parts by weight per 100 parts by weight of the binder.

14. A magnetic recording medium as claimed in claim 1, wherein the magnetic recording layer has a dry thickness within the range of 1 to 18 $\mu$m.

* * * * *